United States Patent Office 3,068,264
Patented Dec. 11, 1962

3,068,264
TETRACYCLINE ANTIBIOTIC-ALUMINUM-PHOSPHORIC ACID COMPLEXES
George Madison Sieger, East Paterson, N.J., William Charles Barringer, Pearl River, N.Y., and Edward Grant Remmers, Fort Lee, N.J., assignors to American Cyanamid Company, New York, N.Y., a corporation of Maine
No Drawing. Filed June 6, 1961, Ser. No. 115,103
6 Claims. (Cl. 260—448)

This invention relates to complexes formed from broad spectrum tetracycline antibiotics, aluminum, and phosphoric acids. The invention includes the new tetracycline antibiotic-aluminum-phosphoric acid complexes, the methods of making these complexes, and thereapeutic preparations containing the same.

The tetracycline antibiotics involved in the present invention include tetracycline itself, 7-chlorotetracycline, 5-hydroxytetracycline, 6-demethyltetracycline, 7-chloro-6-demethyltetracycline, 6-deoxy-tetracycline, 6-demethyl-6-deoxytetracycline, and various derivatives of these such as the following tetracycline compounds; 7-bromo-6-demethyl-6-deoxytetracycline, 7-chloro-6-demethyl-6-deoxytetracycline, 7-bromo-6-deoxytetracycline, 7-chloro-6-deoxytetracycline, 7-chloro-5-hydroxy-6-deoxytetracycline, 7-bromo-5-hydroxy-6-deoxytetracycline, and 5-hydroxy-6-deoxytetracycline. The expression "tetracycline antibiotic" as used throughout the specification and claims is intended to embrace any of the foregoing tetracycline compounds. It is to be understood that those tetracyclines which are commercial or potentially commercial drugs such as 7-chlorotetracycline, tetracycline, 5-hydroxytetracycline, 6-demethyltetracycline, and 7-chloro-6-demethyltetracycline are especially preferred because of their ready availability and demonstrated clinical usefulness.

The use of the tetracycline antibiotics administered orally presents some problems where it is desired to have the antibiotic penetrate the blood stream, as in many cases there is considerable loss through poor absorption of antibiotic and thus only a portion appears in the blood. In the past, various attempts have been made to increase the blood levels obtained by oral feeding of tetracycline antibiotics with various substances which have been generally referred to in the art as adjuvants. It is also desirable to be able to administer the broad spectrum tetracycline antibiotics parenterally as in many instances a subject is unwilling or unable to swallow or accept them orally, and for animals, particularly, it may be difficult to administer the material orally. If administered orally, there is always a question as to whether or not the subject actually ingested the antibiotic. It is a distinct advantage of the novel complexes of the present invention that they may be administered either orally or parenterally.

It has now been found that the tetracycline antibiotics form unusually soluble complexes with aluminum and phosphoric acids. These complexes are not of a simple nature but has a definite composition. The complexes of the present invention may contain from 1 to 4 moles of aluminum per mole of tetracycline antibiotic, and from 1 to 12 moles of a phosphoric acid per mole of tetracycline antibiotic. The number of moles of acid is preferably at least as great as the number of moles of aluminum. The phosphoric acids involved in the formation of the complexes of the present invention include metaphosphoric acid, orthophosphoric acid, pyrophosphoric acid, and polyphosphoric acid.

The complexes of the present invention do not have sharp melting points but in general darken over a considerable temperature range, usually above 165° C. The exact characteristics of the complexes vary, depending upon the tetracycline antibiotic being employed and upon the particular phosphoric acid being employed. Variations in the molar ratios of the components cause variations in the apparent characteristics. The complexes exhibit the biological activity against microorganisms which is to be anticipated from their tetracycline antibiotic content, and give a comparatively high blood level without irritation.

The unusual solubility of the novel complexes of the present invention is an obvious advantage in the preparation of parenteral products and other pharmaceutically desirable products such as elixirs, syrups, pediatric drops, sprays, infusions and the like. The novel tetracycline antibiotic-aluminum-phosphoric acid complexes of the present invention have a solubility of from 30 mg. to 100 mg. or more per milliliter of water within a pH range of from about 6.5 to about 8.0 whereas they are virtually insoluble in water within a pH range of from about 3.0 to about 5.0. It is extremely advantageous that the novel complexes of the present invention are water soluble within the parenteral pH range and virtually water insoluble within the oral pH range. In addition, the solutions are physically and biologically stable for long periods of time, retaining their clear color and their antibiotic potency for many months at room temperature. These novel complexes also form stable solutions or suspensions in organic liquids such as propylene glycol, polyethylene glycol, peanut oil, castor oil, and other organic solvents which are often used in the administration of pharmaceutical products. The reason for the unusual characteristics of the novel complexes of the present invention over other forms of the tetracycline antibiotics is not known. Their outward appearance and physiological behavior seem to be alike. The outstanding difference in solubility, however, indicates a difference in structure.

The novel complexes of the present invention may be most conveniently formed in aqueous solution, although they may also be formed in organic solvents or mixtures of organic solvents. The tetracycline antibiotic, the aluminum, and the phosphoric acid may be added in any form which will release the antibiotic, the aluminum ions, and the phosphoric acid anions for complex formation. The complex may be used in the aqueous solution in which formed or it may be recovered from the solution in a number of different ways as will be apparent from the examples. The complex may be recovered by simple evaporation of the solvent, preferably at reduced pressure and at low temperatures. Alternatively, the complex may be recovered by precipitation from the solution by altering the solvent system, as for instance, by the addition of a water soluble organic solvent to an aqueous solution which produces a system in which the complex is less soluble. If the complex is formed in high concentration, it may precipitate out on standing. Since various methods of recovering the complexes are available and as this is not a critical part of the invention, further elaboration is unnecessary.

The particular phosphoric acid employed for complex formation may be added as its alkali metal salt such as sodium pyrophosphate, as its acid anhydride such as $P_2O_5$, or as the free acid itself. The aluminum may be added as an alkoxide. Aluminum isopropoxide and aluminum ethoxide are particularly convenient. Other forms of aluminum such as aluminum citrate, aluminum nitrate, aluminum tartrate, aluminum chloride and aluminum sulfate may be used. The tetracycline antibiotic may be added as the free base, the hydrochloride, the hydrobromide, the nitrate, the sulfate, or as the sodium salt or other alkali metal salt, or as the calcium salt or other alkaline earth metal salt. Effectively, any form of aluminum which is ionizable and any form of the tetracycline antibiotics of the present invention which gives the ionizable form of the antibiotic may be used in preparing the present complexes. The formation of the complex, as is frequent in complex formation, may be a rather slow process and may require from a few minutes to several hours depending upon conditions.

The methods of administering the complexes of the present invention to mammals are quite varied. For parenteral products, aqueous solutions or solvent pairs such as aqueous propylene glycol may be employed. This modification includes the addition of the complex to water in the case of animals which obtain their water from a central source. In the case of parenteral solutions, there may be added anti-oxidants such as sodium formaldehyde sulfoxylate or ascorbic acid and local anesthetics such as procaine hydrochloride or xylocaine hydrochloride. When desired, the components may be admixed in the proper proportion as a dry formulation to which water may be added in order to obtain the complex in aqueous solution.

The complexes of the present invention may be used for oral administration enclosed in hard or soft shell gelatin capsules or they may be incorporated with animal feeds. A dosage unit for oral administration to humans is most conveniently from about 250 mg. to about 1500 mg. of the complex. Inert materials such as starch, sucrose, or magnesium stearate may be added if desired. A preferred composition consists of sufficient complex to give 150–250 mg. of the antibiotic equivalent in a soft gelatin capsule. If desired, the complexes may be granulated and administered as such or may be compressed into tablets.

In general, the methods of administering the complexes of the present invention do not depart from the conventional methods of administering tetracycline antibiotics. This is an advantage of the present invention and improved results are obtained without requiring any special technique of administration. The complexes of the present invention will be administered by the attending physician or veterinarian in accordance with the age and condition of the patient, the nature of the disease, and in view of the other considerations peculiar to the individual patient.

A more comprehensive understanding of this invention may be obtained by reference to the following specific examples.

EXAMPLE 1

*7-Chloro-6-Demethyltetracycline-Aluminum-Polyphosphate (1:4:12)*

In 100 ml. of chloroform was suspended 19.2 g. of polyphosphoric acid, with stirring, and then 100 ml. of methanol was added and stirring was continued until a clear solution was obtained. To this solution was added 16.3 g. of aluminum isopropoxide. The resulting mixture was stirred for one hour. At the end of this time there was added 9.2 g. of 7-chloro-6-demethyltetracycline and this mixture was stirred for an additional 30 minutes. The reaction mixture was then poured into 500 ml. of isopropanol and the precipitate which formed was collected by filtration and dried in vacuo over $P_2O_5$. There was thus obtained 30 g. of the 7-chloro-6-demethyltetracycline-aluminum-polyphosphate complex.

EXAMPLE 2

*6-Demethyltetracycline-Aluminum-Polyphosphate (1:4:12)*

In place of the 7-chloro-6-demethyltetracycline of Example 1, there is employed an equimolar quantity of 6-demethyltetracycline whereby the 6-demethyltetracycline-aluminum-polyphosphate complex is obtained in equally good yield.

EXAMPLE 3

*Tetracycline-Aluminum-Polyphosphate (1:4:12)*

Example 1 is repeated but employing an equimolar amount of tetracycline in place of the 7-chloro-6-demethyltetracycline of that example. There is obtained the tetracycline-aluminum-polyphosphate complex in equally good yield.

EXAMPLE 4

*7-Chloro-6-Demethyltetracycline-Aluminum-Pyrophosphate (1:1:1)*

In 200 ml. of distilled water was dissolved 9.5 g. of aluminum chloride hexahydrate, with stirring. To the resulting solution was added 17.0 g. of sodium pyrophosphate decahydrate and 18.25 g. of 7-chloro-6-demethyltetracycline. The pH of the resulting suspension was raised to about 7.5 with 10% sodium hydroxide solution, whereby an essentially clear solution was obtained. This was filtered, frozen and lyophilized. The product so obtained was finally dried in vacuo over $P_2O_5$ whereby there was obtained 32 g. of the 7-chloro-6-demethyltetracycline-aluminum-pyrophosphate complex.

EXAMPLE 5

*6-Demethyltetracycline-Aluminum-Pyrophosphate (1:1:1)*

By replacing the 7-chloro-6-demethyltetracycline employed in Example 4 by an equimolecular quantity of 6-demethyltetracycline and following substantially the same procedure described in Example 4, there is obtained the 6-demethyltetracycline-aluminum-pyrophosphate complex.

EXAMPLE 6

*Tetracycline-Aluminum-Pyrophosphate (1:1:1)*

The procedure of Example 4 is repeated substituting an equimolecular amount of tetracycline for the 7-chloro-6-demethyltetracycline employed in that example. There is thus obtained the tetracycline-aluminum-pyrophosphate complex.

EXAMPLE 7

*6-Demethyltetracycline-Aluminum-Orthophosphate (1:4:12)*

In 100 ml. of distilled water was dissolved 23.1 g. of orthophosphoric acid and to the resulting solution was added 13.6 g. of aluminum isopropoxide. The mixture was stirred until clear and then 7.2 of 6-demethyltetracycline was added and stirring was continued until a clear solution was obtained. This clear solution was then poured into a mixture of 150 ml. of isopropanol and 150 ml. of acetone. The precipitate which formed was collected by filtration, washed with acetone, and dried in vacuo over $P_2O_5$. There was thus obtained 21.2 g. of the 6 - demethyltetracycline - aluminum - orthophosphate complex.

EXAMPLE 8

*7-Chloro-6-Demethyltetracycline-Aluminum-Orthophosphate (1:4:12)*

By replacing the 6-demethyltetracycline employed in Example 7 by an equimolecular quantity of 7-chloro-6-demethyltetracycline and following substantially the same procedure described in Example 7, there is obtained the 7-chloro-6-demethyltetracycline-aluminum - orthophosphate complex.

EXAMPLE 9

*Tetracycline-Aluminum-Orthophosphate (1:4:12)*

The procedure of Example 7 is repeated substituting an equimolecular amount of tetracycline for the 6-demethyltetracycline employed in that example. There is thus obtained the tetracycline-aluminum-orthophosphate complex.

EXAMPLE 10

*Tetracycline-Aluminum-Metaphosphate (1:4:12)*

In 300 ml. of chloroform was suspended 42.9 g. of $P_2O_5$, with stirring, and to this suspension was then added 5.4 ml. of distilled water. After stirring for 15 minutes, there was added 300 ml. of methanol and stirring was continued until a clear solution was obtained. To this solution was then added 40.8 g. of aluminum isopropoxide and stirring was again continued for one hour. To this solution was then added 22.3 g. of tetracycline and stirring was again continued for 30 minutes. The resulting suspension was poured into 1500 ml. of isopropanol and the precipitate which formed was collected by filtration and dried in vacuo over $P_2O_5$. There was thus obtained 85 g. of the tetracycline-aluminum-metaphosphate complex.

EXAMPLE 11

*6-Demethyltetracycline-Aluminum-Metaphosphate (1:4:12)*

In place of the tetracycline of Example 10, there is employed an equimolar quantity of 6-demethyltetracycline whereby the 6-demethyltetracycline-aluminum-metaphosphate complex is obtained in equally good yield.

EXAMPLE 12

*7-Chloro-6-Demethyltetracycline-Aluminum-Metaphosphate (1:4:12)*

Example 10 is repeated but employing an equimolar amount of 7-chloro-6-demethyltetracycline in place of the tetracycline of that example. There is obtained the 7-chloro-6-demethyltetracycline-aluminum-metaphosphate complex in equally good yield.

EXAMPLE 13

*Tetracycline-Aluminum-Metaphosphate (1:4:8)*

In 100 ml. of chloroform was suspended 9.6 g. of $P_2O_5$, with stirring, and to this suspension was then added 1.2 ml. of distilled water. After stirring for 15 minutes, there was added 100 ml. of methanol and stirring was continued until a clear solution was obtained. To this solution was then added 13.6 g. of aluminum isopropoxide and stirring was again continued for 1.5 hours. To this solution was then added 7.4 g. of tetracycline and stirring was again continued for 30 minutes. The resulting suspension was poured into 500 ml. of isopropanol and the precipitate which formed was collected by filtration and dried in vacuo over $P_2O_5$. There was thus obtained 19 g. of the tetracycline-aluminum-metaphosphate complex.

EXAMPLE 14

*6-Demethyltetracycline-Aluminum-Metaphosphate (1:2:6)*

In 25 ml. of chloroform was suspended 2.14 g. of $P_2O_5$, with stirring, and to this suspension was then added 0.3 ml. of distilled water. After stirring for 15 minutes, there was added 25 ml. of methanol and stirring was continued until a clear solution was obtained. To this solution was then added 2.04 g. of aluminum isopropoxide and stirring was again continued for one hour. To this solution was then added 2.15 g. of 6-demethyltetracycline and stirring was again continued for 30 minutes. The resulting suspension was poured into 125 ml. of isopropanol and the precipitate which formed was collected by filtration and dried in vacuo over $P_2O_5$. There was thus obtained 5.1 g. of the 6-demethyltetracycline-aluminum-metaphosphate complex.

What is claimed is:

1. A complex of a broad spectrum tetracycline antibiotic selected from the group consisting of tetracycline, 7-chlorotetracycline, 5-hydroxytetracycline, 6-demethyltetracycline and 7-chloro-6-demethyltetracycline; aluminum; and an acid selected from the group consisting of metaphosphoric, orthophosphoric, pyrophosphoric, and polyphosphoric; said components being present in the molar ratio of antibiotic to aluminum to acid of not less than 1:1:1 and not greater than 1:4:12.

2. A complex according to claim 1 in which the tetracycline antibiotic is tetracycline.

3. A complex according to claim 1 in which the tetracycline antibiotic is 7-chlorotetracycline.

4. A complex according to claim 1 in which the tetracycline antibiotic is 5-hydroxytetracycline.

5. A complex according to claim 1 in which the tetracycline antibiotic is 7-chloro-6-demethyltetracycline.

6. A complex according to claim 1 in which the tetracycline antibiotic is 6-demethyltetracycline.

References Cited in the file of this patent

UNITED STATES PATENTS

| | | |
|---|---|---|
| 2,736,725 | Ritter | Feb. 28, 1956 |
| 2,791,609 | Kaplan | May 7, 1957 |
| 2,795,528 | Buckwalter et al. | June 11, 1957 |